(12) United States Patent
Gheorghiu et al.

(10) Patent No.: US 9,094,991 B2
(45) Date of Patent: Jul. 28, 2015

(54) METHOD AND APPARATUS FOR SUPPORTING COMMUNICATION IN LOW SNR SCENARIO

(75) Inventors: Valentin Alexandru Gheorghiu, Tokyo (JP); Ravi Palanki, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 12/729,756

(22) Filed: Mar. 23, 2010

(65) Prior Publication Data

US 2010/0246427 A1 Sep. 30, 2010

Related U.S. Application Data

(60) Provisional application No. 61/163,701, filed on Mar. 26, 2009.

(51) Int. Cl.
| | |
|---|---|
| *H04W 72/04* | (2009.01) |
| *H04W 72/08* | (2009.01) |
| *H04L 1/00* | (2006.01) |
| *H04L 5/00* | (2006.01) |

(52) U.S. Cl.
CPC ............. *H04W 72/087* (2013.01); *H04L 1/007* (2013.01); *H04L 1/0072* (2013.01); *H04W 72/04* (2013.01); *H04W 72/08* (2013.01); *H04L 5/0007* (2013.01); *H04L 5/0053* (2013.01); *H04W 72/0486* (2013.01)

(58) Field of Classification Search
None
See application file for complete search history.

(56) References Cited

U.S. PATENT DOCUMENTS

| | | | |
|---|---|---|---|
| 6,459,901 B1 * | 10/2002 | Chawla et al. | 455/450 |
| 6,891,858 B1 * | 5/2005 | Mahesh et al. | 370/480 |
| 2004/0029591 A1 * | 2/2004 | Chapman et al. | 455/452.1 |
| 2004/0218606 A1 * | 11/2004 | Leatherbury et al. | 370/395.5 |
| 2006/0104379 A1 * | 5/2006 | Li et al. | 375/267 |
| 2006/0285607 A1 * | 12/2006 | Strodtbeck et al. | 375/298 |

(Continued)

FOREIGN PATENT DOCUMENTS

| | | |
|---|---|---|
| EP | 1909465 | 4/2008 |
| EP | 2124369 | 11/2009 |

(Continued)

OTHER PUBLICATIONS

International Search Report and Written Opinion—PCT/US2010/028549, International Search Authority—European Patent Office—Oct. 7, 2010.

*Primary Examiner* — Jutai Kao
(74) *Attorney, Agent, or Firm* — François A. Pelaez

(57) ABSTRACT

Techniques for supporting communication for wireless devices in a wireless network are described. The wireless network may support a first physical channel having a first minimum SNR for reliable reception. Some wireless devices may require operation at a lower SNR. In an aspect, low SNR operation may be supported by transmitting data on a second physical channel that can be reliably received at a second minimum SNR that is lower than the first minimum SNR. In another aspect, low SNR operation may be supported by transmitting data on both the first and second physical channels. In yet another aspect, low SNR operation may be supported by transmitting data in multiple instances of the first and/or second physical channel. In yet another aspect, low power operation may be supported by transmitting the second physical channel in a portion of the system bandwidth instead of across the entire system bandwidth.

20 Claims, 8 Drawing Sheets

(56) References Cited

U.S. PATENT DOCUMENTS

| | | | |
|---|---|---|---|
| 2008/0227388 A1* | 9/2008 | Popovski et al. | 455/17 |
| 2008/0239977 A1 | 10/2008 | Xue et al. | |
| 2010/0172316 A1* | 7/2010 | Hwang et al. | 370/330 |
| 2011/0299449 A1* | 12/2011 | kwon et al. | 370/312 |
| 2012/0093135 A1* | 4/2012 | Anderson et al. | 370/336 |
| 2013/0265870 A1* | 10/2013 | Dale et al. | 370/230.1 |

FOREIGN PATENT DOCUMENTS

| | | |
|---|---|---|
| WO | WO2008087838 | 7/2008 |
| WO | WO2010282084 | 7/2010 |

\* cited by examiner

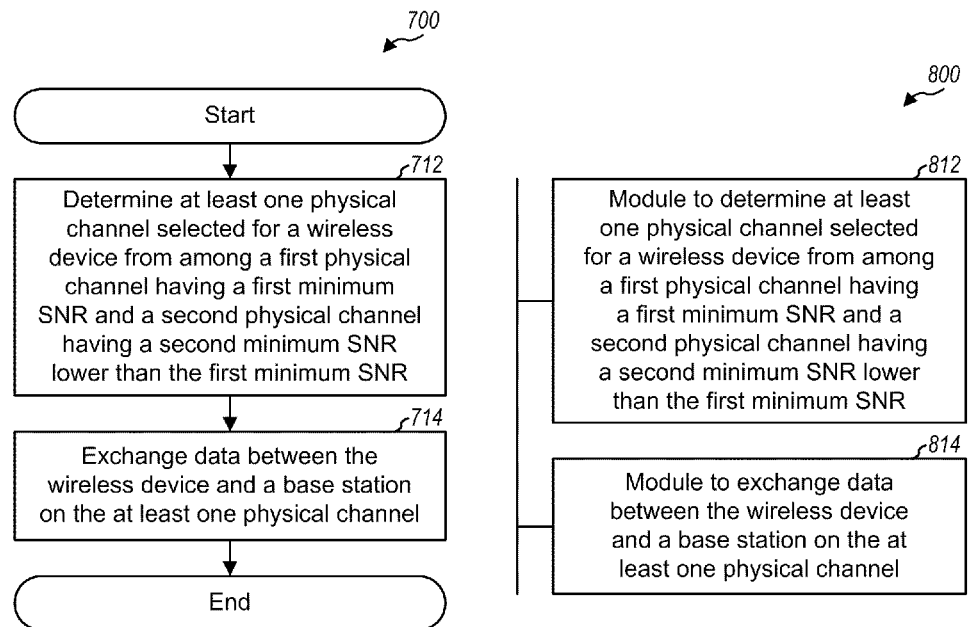
FIG. 7
FIG. 8
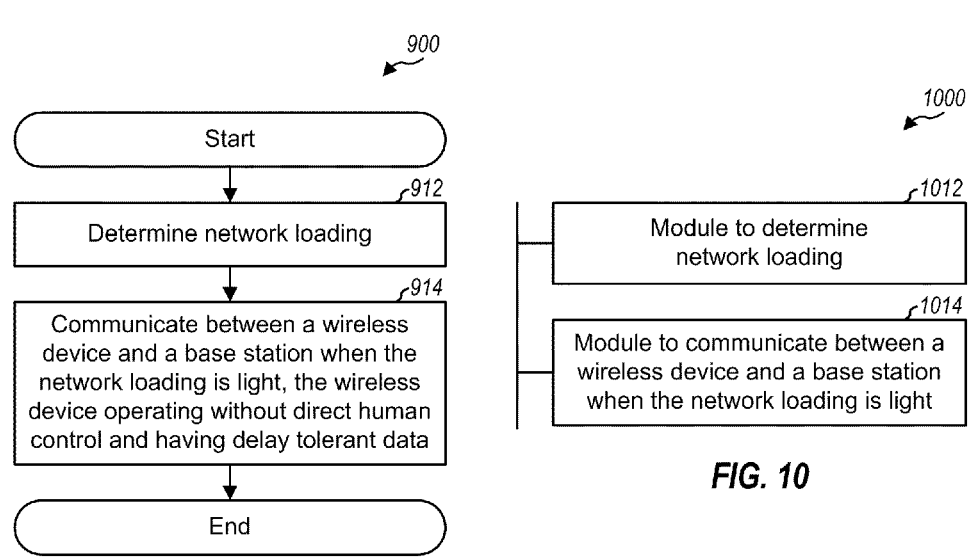
FIG. 9
FIG. 10

METHOD AND APPARATUS FOR SUPPORTING COMMUNICATION IN LOW SNR SCENARIO

The present application claims priority to provisional U.S. Application Ser. No. 61/163,701, entitled "ENHANCEMENTS FOR MACHINE-TO-MACHINE COMMUNICATION," filed Mar. 26, 2009, assigned to the assignee hereof and incorporated herein by reference.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of wireless devices. A wireless device may be a user equipment (UE), a remote device, etc. A UE is a device that operates under direct control by humans. Some examples of UEs include cellular phones, smart phones, personal digital assistants (PDAs), wireless modems, handheld devices, laptop computers, netbooks, etc. A remote device is a device that operates without being directly controlled by humans. Some examples of remote devices include sensors, meters, location tags, etc. A remote device may communicate with a base station, another remote device, or some other entity. Machine-to-machine (M2M) communication refers to communication involving at least one remote device on at least one end of the communication.

Remote devices may have certain requirements such as low signal-to-noise ratio (SNR) operation, low power consumption, etc. It may be desirable to support operation of remote devices in light of these requirements.

SUMMARY

Techniques for supporting communication for wireless devices (e.g., remote devices) in a wireless network are described herein. The wireless network may support transmission of data (e.g., control data and/or traffic data) on a first physical channel having a first minimum SNR for reliable reception. Some wireless devices may require operation at a lower SNR than the first minimum SNR.

In an aspect, low SNR operation may be supported by transmitting data on a second physical channel that can be reliably received at a second minimum SNR, which is lower than the first minimum SNR of the first physical channel. In another aspect, low SNR operation may be supported by transmitting data on both the first and second physical channels. In yet another aspect, low SNR operation may be supported by transmitting data in multiple instances of the first and/or second physical channel. In yet another aspect, low power operation may be supported by transmitting the second physical channel in a portion of the system bandwidth instead of across the entire system bandwidth.

In one design, at least one physical channel may be selected for a wireless device from among the first physical channel having the first minimum SNR and the second physical channel having the second minimum SNR. In one design, either the first or second physical channel may be selected for the wireless device based on an SNR requirement, or a category, or some other characteristics of the wireless device. In another design, the first and second physical channels may both be selected for the wireless device based on the SNR requirement, or category, or some other characteristics of the wireless device. In any case, data may be exchanged (e.g., transmitted or received) between the wireless device and a base station on the at least one physical channel.

The first and second physical channels may have different characteristics besides their minimum SNRs. For example, the first physical channel may be transmitted in a first region (e.g., a control region) of a subframe, and the second physical channel may be transmitted in a second region (e.g., a data region) of the subframe. The second physical channel may have a lower code rate and more redundancy than the first physical channel. The first physical channel may be transmitted in any part of the system bandwidth whereas the second physical channel may be restricted to a portion of the system bandwidth. Data may be transmitted in a single instance of the first physical channel and may be transmitted in one or more instances of the second physical channel to improve reliability. There may be other differences between the first and second physical channels.

Various aspects and features of the disclosure are described in further detail below.

BRIEF DESCRIPTION OF THE DRAWINGS

FIG. 7 shows a process for communicating in low SNR scenario.

FIG. 8 shows an apparatus for communicating in low SNR scenario.

FIG. 9 shows a process for communicating based on network loading.

FIG. 10 shows an apparatus for communicating based on network loading.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE.

Figure 1:
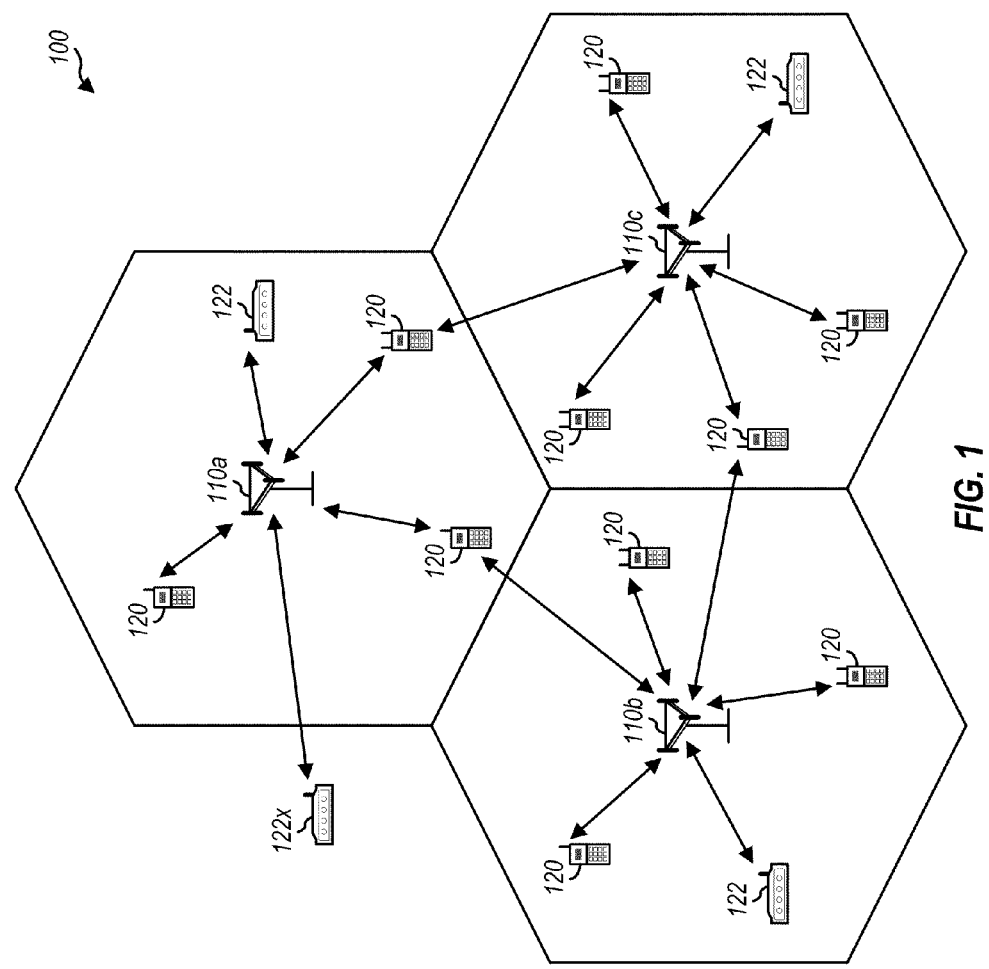
FIG. 1 shows a wireless communication network.

FIG. 1 shows a wireless communication network 100, which may be an LTE network or some other wireless network. Wireless network 100 may include a number of base stations 110 and other network entities. A base station is an entity that communicates with wireless devices and may also be referred to as a Node B, an evolved Node B (eNB), an access point, etc. Each base station 110 may provide communication coverage for a particular geographic area and may support communication for wireless devices located within the coverage area. To improve system capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area. A base station may support one or multiple (e.g., three) cells.

A number of wireless devices may be dispersed throughout the wireless network, and these wireless devices may include UEs 120, remote devices 122, etc. A UE may also be referred to as a mobile station, a terminal, an access terminal, a subscriber unit, a station, etc. A remote device may also be referred to as a machine, an unmanned device, etc. A wireless device may be stationary or mobile and may communicate with a base station via the downlink and/or uplink. The downlink (or forward link) refers to the communication link from the base station to the wireless device, and the uplink (or reverse link) refers to the communication link from the wireless device to the base station.

Figure 2:
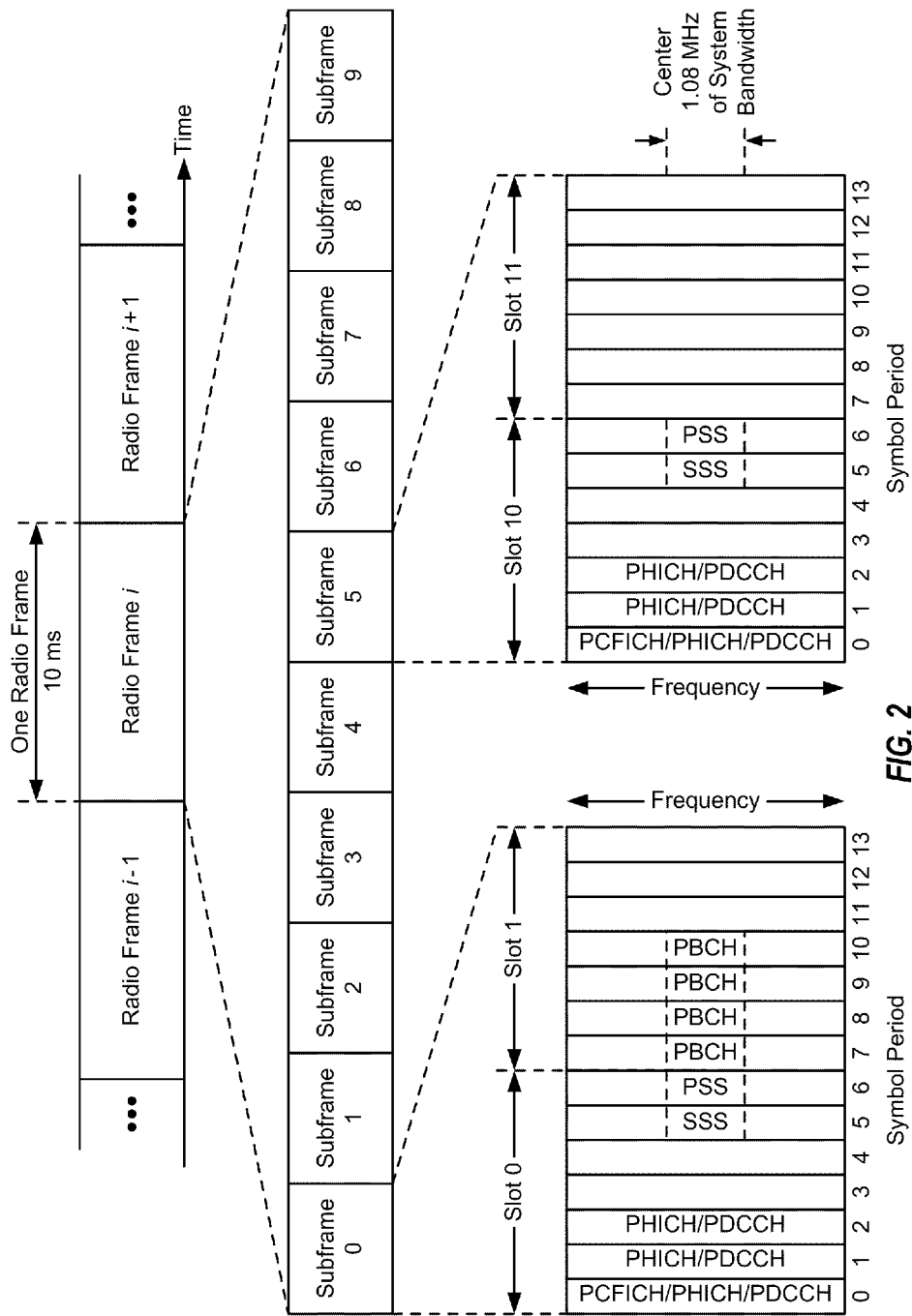
FIG. 2 shows an exemplary frame structure for the downlink.

FIG. 2 shows a frame structure for the downlink in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include S symbol periods, e.g., seven symbol periods for a normal cyclic prefix (as shown in FIG. 2) or six symbol periods for an extended cyclic prefix. The 2S symbol periods in each subframe may be assigned indices of 0 through 2S-1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The time-frequency resources available for each link may be partitioned into units of resource blocks. Each resource block may cover 12 subcarriers in one slot and may include a number of resource elements. Each resource element may cover one subcarrier in one symbol period and may be used to send one modulation symbol, which may be a real or complex value. On the downlink, an OFDM symbol may be transmitted in each symbol period of a subframe. On the uplink, an SC-FDMA symbol may be transmitted in each symbol period of a subframe. An OFDM symbol or an SC-FDMA symbol may include non-zero symbols on subcarriers used for transmission and zero symbols on subcarriers not used for transmission.

In LTE, a base station may transmit a primary synchronization signal (PSS) and a secondary synchronization signal (SSS) for each cell supported by the base station. The PSS and SSS may be transmitted in symbol periods 6 and 5, respectively, in each of subframes 0 and 5 of each radio frame with the normal cyclic prefix, as shown in FIG. 2. The PSS and SSS may be used by wireless devices for cell detection and acquisition. The base station may transmit a Physical Broadcast Channel (PBCH) in symbol periods 0 to 3 in slot 1 of subframe 0 of certain radio frames. The PBCH may carry some system information.

Figure 3A:
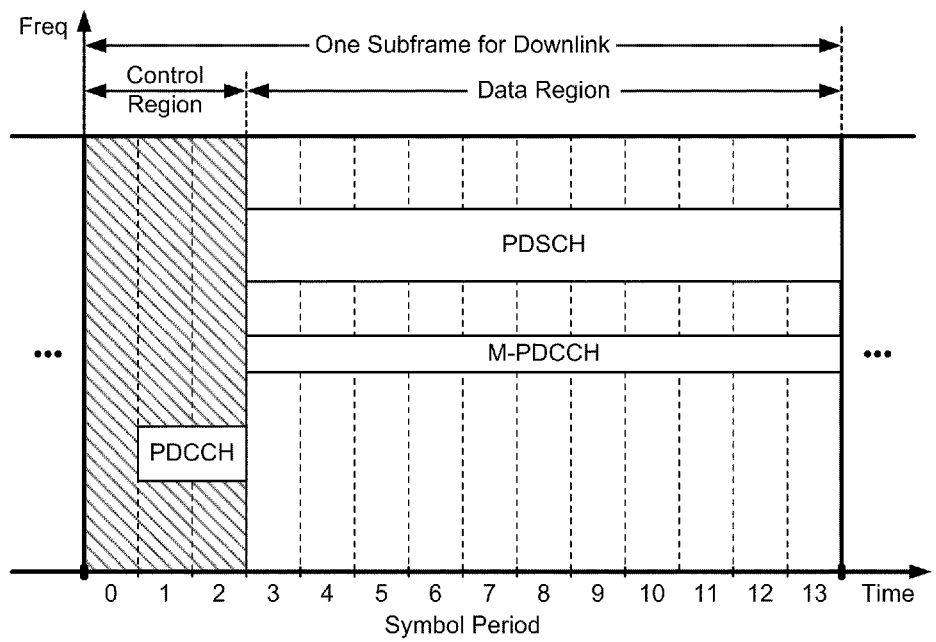
FIG. 3A shows an exemplary subframe structure for the downlink.

FIG. 3A shows a subframe structure for the downlink in LTE. A subframe for the downlink may include a control region and a data region, which are time division multiplexed. The control region may include the first Q symbol periods of the subframe, where Q may be equal to 1, 2, 3 or 4. Q may change from subframe to subframe and may be conveyed in the first symbol period of the subframe. The control region may carry control data/information. The data region may include the remaining 2S-Q symbol periods of the subframe and may carry traffic data and/or other information for wireless devices.

In LTE, a base station may transmit a Physical Control Format Indicator Channel (PCFICH), a Physical Hybrid ARQ Indicator Channel (PHICH), and one or more instances of a Physical Downlink Control Channel (PDCCH) in the control region of a subframe. The PCFICH may be transmitted in the first symbol period of the subframe (not shown in FIG. 2) and may convey the size of the control region (i.e., the number of symbol periods Q for the control region). The PHICH may carry acknowledgement (ACK) and negative acknowledgement (NACK) information for data transmission sent on the uplink with hybrid automatic repeat request (HARQ). Each instance of the PDCCH may be transmitted in one or more Control Channel Elements (CCEs), with each CCE including 36 resource elements. Each instance of the PDCCH may carry downlink control information (DCI) for one or more wireless devices. The DCI sent in each PDCCH may convey one or more downlink grants, one or more uplink grants, power control information, and/or other control information. A downlink grant may carry control information for data transmission on the downlink. An uplink grant may carry control information for data transmission on the uplink. A grant may be sent to a specific wireless device or a group of wireless devices and may also be referred to as an assignment. A wireless device may be configured to listen to one or more instances of the PDCCH.

The base station may transmit a Physical Downlink Shared Channel (PDSCH) in the data region of a subframe. The PDSCH may carry traffic data for wireless devices scheduled for data transmission on the downlink.

The base station may transmit the PSS, SSS and PBCH in the center 1.08 MHz of the system bandwidth (as shown in FIG. 2). The base station may transmit the PCFICH and PHICH across the entire system bandwidth in each symbol period in which these channels are transmitted. The base station may transmit each instance of the PDCCH to one or more wireless devices in certain portion of the system bandwidth. The base station may transmit the PDSCH to specific wireless devices in specific portions of the system bandwidth.

Figure 3B:
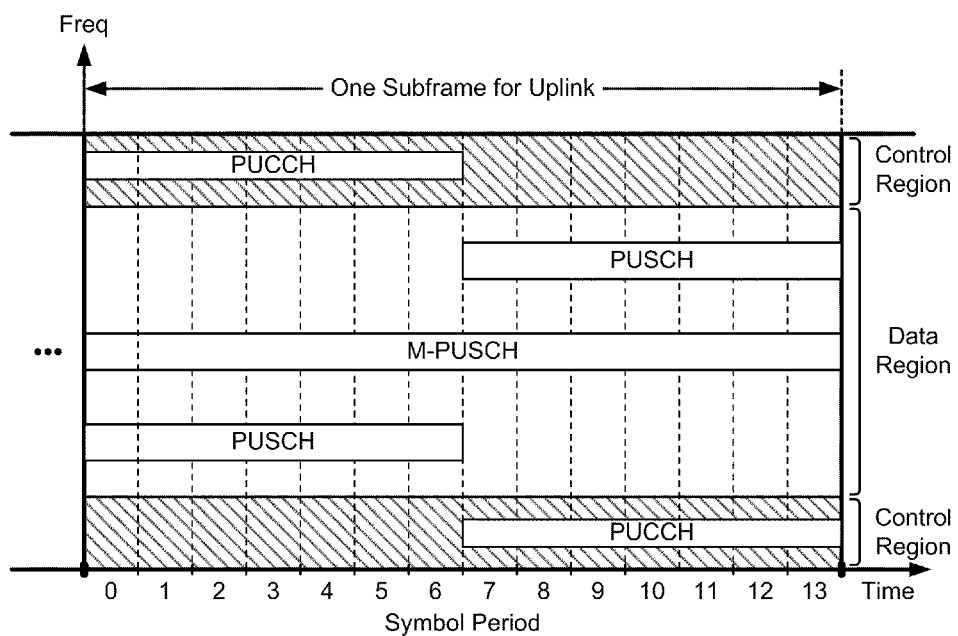
FIG. 3B shows an exemplary subframe structure for the uplink.

FIG. 3B shows a subframe structure for the uplink in LTE. A subframe for the uplink may include a control region and a data region, which are frequency division multiplexed. The control section may be formed at the two edges of the system bandwidth, as shown in FIG. 3B. The control section may have a configurable size, which may be selected based on the amount of control information being sent on the uplink by wireless devices. The data section may include all resource blocks not included in the control section.

A wireless device may transmit either a Physical Uplink Control Channel (PUCCH) in the control region or a Physical Uplink Shared Channel (PUSCH) in the data region of a subframe. The PUCCH may carry control data such as ACK/NACK information for data transmission sent on the downlink, channel quality indicator (CQI) information, scheduling request, etc. The PUSCH may carry only traffic data or both traffic data and control data from the wireless device.

The various signals and channels in LTE are described in 3GPP TS 36.211, entitled "Evolved Universal Terrestrial Radio Access (E-UTRA); Physical Channels and Modulation," which is publicly available.

The wireless network may support M2M communication for remote devices as well as various M2M applications. These M2M applications may be very diverse and may vary significantly in their communication requirements. For example, some remote devices such as sensors, meters, etc., (e.g., remote device 122x in FIG. 1) may be located in remote areas with limited coverage or outside the normal coverage of the wireless network. These remote devices can be supported if the wireless network can provide extended coverage. LTE and other radio technologies are typically designed for well-planned wireless networks that can offer connectivity down to a particular minimum SNR, which may be about −5 decibels (dB). A main limitation for this is the control channels. Some enhancements to the control channels may be needed to support operation of remote devices at lower SNR. Low SNR operation may be required for remote devices because they are out-of-coverage and/or have only one receive antenna.

Some remote devices such as sensors, meters, vending machines, etc., may have low data rate requirements. Furthermore, these remote devices may have limited access to electric power, or it may be impractical to change battery often. For these remote devices, low power consumption and longer battery life may be highly desirable.

Many M2M applications can tolerate relatively long delay for data transmission. To extend network coverage, data transmission may be sent to/from remote devices under low SNR conditions, which would lead to lower spectral efficiency. The lower spectral efficiency may adversely impact the performance of the entire wireless network.

In general, a remote device may have one or more of the following characteristics:
1. Require low SNR operation,
2. Require low power consumption, and
3. Tolerant to delay.

In an aspect, low SNR operation may be supported by transmitting data (e.g., control data and/or traffic data) on a robust physical channel that can be reliably received at a lower SNR than the minimum SNR of other physical channels such as the PDCCH and PDSCH. The minimum SNR of a physical channel is the lowest SNR at which the physical channel can be reliably received, e.g., with a target error rate or lower. The robust physical channel may be referred to as a Machine PDCCH (M-PDCCH). The M-PDCCH may be transmitted in the data region of a subframe. A lower code rate may be used for the M-PDCCH to generate more redundancy information for the data being transmitted. The extra redundancy information may allow the data to be recovered at a lower SNR than the minimum SNR of the PDCCH and PDSCH. For example, the PDCCH and PDSCH may support operation down to about −5 dB SNR, and the M-PDCCH may support operation down to about −10 dB, −15 dB, or some other low SNR. Since the data region includes more resource elements than the control region, more resource elements may be assigned to the M-PDCCH to carry the extra redundancy information.

In another aspect, low SNR operation may be supported by transmitting data (e.g., control data and/or traffic data) on both the PDCCH and M-PDCCH. The PDCCH may support reliable operation down to a first minimum SNR, and the M-PDCCH may support reliable operation down to a second minimum SNR, which may be lower than the first minimum SNR. Transmitting data on both the PDCCH and M-PDCCH would increase redundancy and allow for reliable reception at a lower SNR than the second minimum SNR. For example, data may be transmitted to a wireless device on both the PDCCH and M-PDCCH in 14 symbol periods of a subframe instead of on only the PDCCH in 3 symbol periods of the control region. The wireless device may then be able to receive the data with a higher SNR, which may be approximately 14/3 or 6.7 dB higher (assuming the same number of subcarriers is used for the PDCCH and M-PDCCH).

In yet another aspect, low SNR operation may be supported by transmitting data (e.g., control data and/or traffic data) in multiple instances of a physical channel (e.g., the M-PDCCH) with aggregation. Conventionally, a single transmission of control data may be sent in a single instance of the PDCCH. To support low SNR operation, multiple transmissions of control data may be sent in multiple instances of the PDCCH or M-PDCCH. This would allow more redundancy information to be sent for the control data, which may enable reliable reception of the control data at a lower SNR. For example, the control data may be transmitted to a wireless device on the M-PDCCH in 11 symbol periods of N subframes instead of on the PDCCH in 3 symbol periods of only one subframe. The wireless device may receive the control information with an SNR that may be approximately (11×N)/3 times higher, or 8.6 dB higher for a case with N=2. In general, multiple instances of the PDCCH or M-PDCCH may be transmitted in the same subframe or different subframes.

Data may also be transmitted in other manners to support low SNR operation and extend coverage of a physical channel (e.g., the PDCCH or M-PDCCH). For example, data may be transmitted in multiple instances of both the PDCCH and M-PDCCH.

In yet another aspect, low power operation may be supported by transmitting a physical channel in a portion of the system bandwidth to a wireless device. Restricting the physical channel to a portion of the system bandwidth may allow the wireless device to monitor for the physical channel with lower power consumption and possibly lower cost.

In one design, a physical channel (e.g., the M-PDCCH) may be transmitted in the center portion of the system bandwidth, e.g., in the 1.08 MHz or narrower center portion of the system bandwidth. This may allow a wireless device to operate on only the bandwidth needed for system acquisition since the PSS, SSS, and PBCH are all transmitted in the center 1.08 MHz of the system bandwidth. In another design, the physical channel may be transmitted in some other portion of the system bandwidth (e.g., near an edge of the system bandwidth). In general, the physical channel may be transmitted in a designated portion of the system bandwidth, which may cover any suitable bandwidth. A smaller bandwidth may enable lower power consumption by wireless devices whereas a wider bandwidth may enable reception at a lower SNR. The bandwidth of the designated portion may be selected based on a tradeoff between performance and power consumption.

Operation on only the designated portion of the system bandwidth may be supported as follows. A wireless device may not need to receive the PCFICH if control data for the wireless device is transmitted in the data region. Control data for the wireless device may be transmitted on the M-PDCCH or the PDSCH in the designated portion of the system bandwidth. Some control data may also be sent via upper layer signaling (e.g., Radio Resource Control (RRC) signaling), which may allow the control data to be transmitted on a different physical channel than the physical channel normally used to transmit that control data. For example, ACK/NACK information may be sent via upper layer signaling on the M-PDCCH or the PDSCH instead of the PHICH. In this case, the wireless device would not need to receive the PHICH.

In yet another aspect, low power operation may be supported by transmitting a physical channel in designated time intervals to a wireless device. For example, the wireless device may need to transmit or receive periodically but at relatively long time intervals. The wireless device may sleep most of the time and may wake up only during periods in which the wireless device can transmit or receive data. The wireless device may thus operate based on a schedule that may be negotiated with a serving base station, or specified in a standard, or conveyed in other manners.

Figure 4:
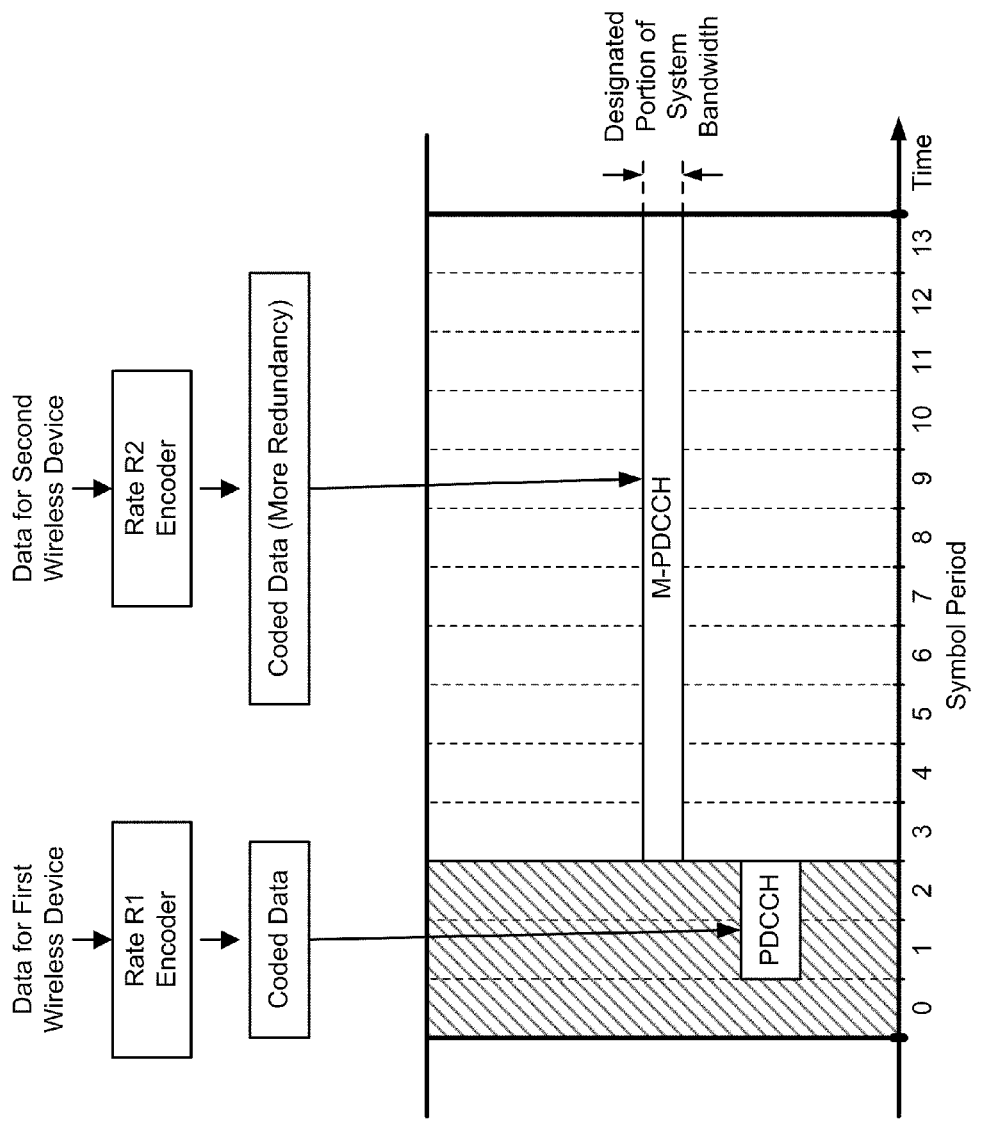
FIG. 4 shows control data transmitted on the first and second physical channels.

FIG. 4 shows a design of transmitting control data on the PDCCH and M-PDCCH. Control data for a first wireless device (e.g., a UE) may be processed (e.g., encoded) based on a first code rate R1 normally used for the PDCCH to generate coded data for the first wireless device. The first code rate R1 may support reliable reception of the PDCCH at the first minimum SNR. The coded data for the first wireless device may be transmitted on the PDCCH in the control region.

Control data for a second wireless device (e.g., a remote device) may be processed based on a second code rate R2 used for the M-PDCCH to generate coded data for the second wireless device. The second code rate for the M-PDCCH may be lower than the first code rate used for the PDCCH. The second code rate may support reliable reception of the M-PDCCH at the second minimum SNR, which may be lower than the first minimum SNR. The coded data for the second wireless device may be transmitted on the M-PDCCH in the data region.

Figure 5:
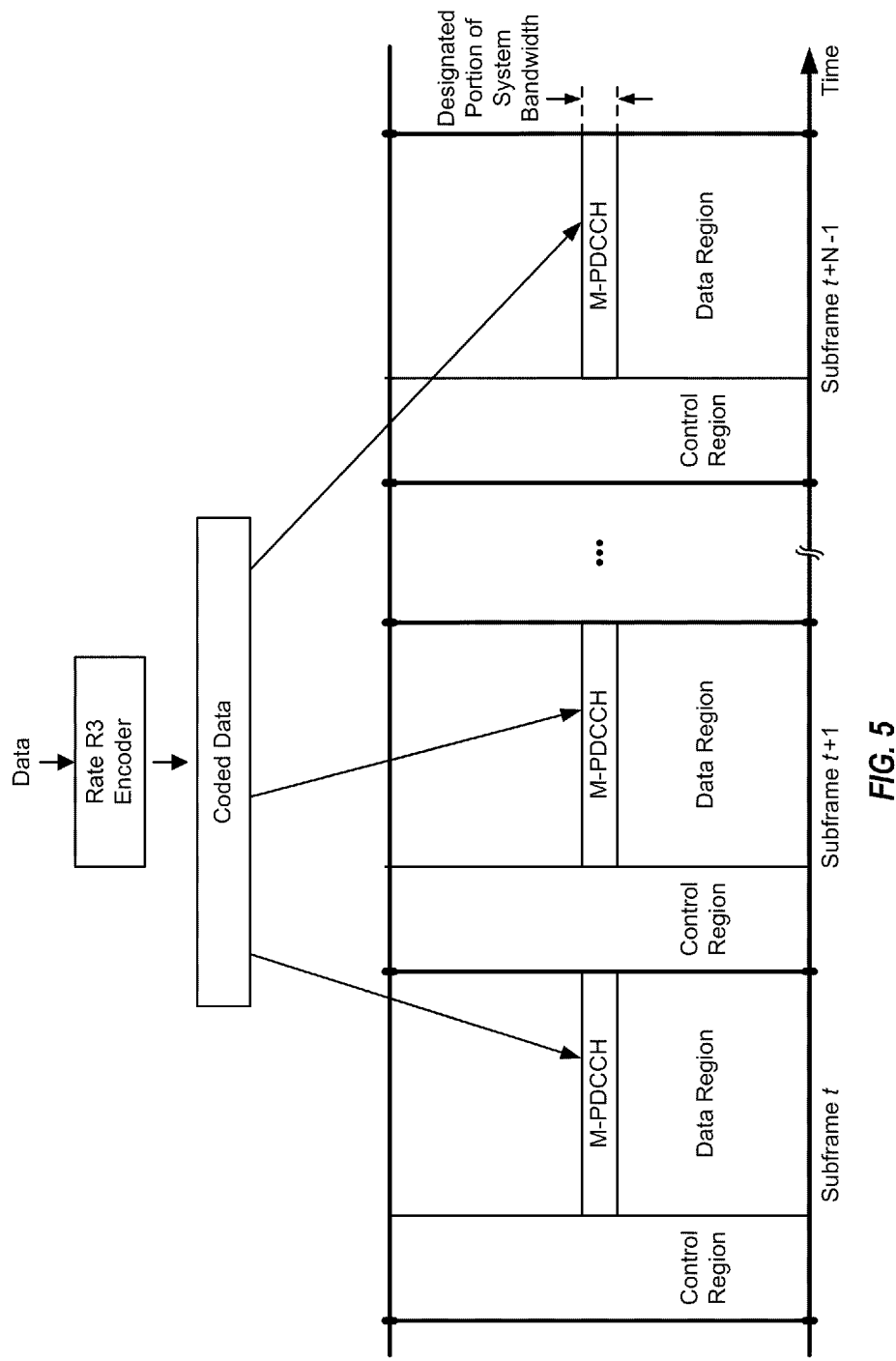
FIG. 5 shows control data transmitted in multiple instances of the second physical channel.

FIG. 5 shows a design of transmitting control data in multiple instances of the M-PDCCH with aggregation. Control data for a wireless device (e.g., a remote device) may be processed to generate coded data for the wireless device. In one design, the control data may be processed based on a third code rate R3, which may be lower than the second code rate R2 used for transmitting control data in one instance of the M-PDCCH. The third code rate may support reliable reception of the M-PDCCH at a third minimum SNR, which may be lower than the second minimum SNR. The coded data may then be partitioned into N parts. A different part of the coded data may be transmitted in each instance of the M-PDCCH. In another design, the control may be processed based on the second code rate R2 used for transmitting control data in one instance of the M-PDCCH. The same coded data may be transmitted in each instance of the M-PDCCH, and the effective code rate with repetition may be close to the third code rate. For both designs, the coded data for the wireless device may be transmitted in N instances of the M-PDCCH in one or multiple subframes.

A wireless device may perform decoding for the M-PDCCH transmitted with aggregation in various manners. In one design, the wireless device may perform decoding after receiving each instance of the M-PDCCH. The wireless device may obtain received symbols for the first instance of the M-PDCCH and may decode the received symbols to recover the control data. If the wireless device correctly decodes the control data, then the wireless device may skip the remaining instances of the M-PDCCH. Conversely, if the wireless device decodes the control data in error, then the wireless device may obtain received symbols for the next instance of the M-PDCCH and may then decode the received symbols from both instances of the M-PDCCH to recover the control data. The wireless device may repeat the process until the control data is decoded correctly or all N instances of the M-PDCCH have been received and decoded. In another design, the wireless device may perform decoding after receiving all N instances, or a certain minimum number of instances, of the M-PDCCH.

As shown in FIGS. 4 and 5, the M-PDCCH may be transmitted in a designated portion of the system bandwidth to a wireless device. The designated portion may cover the center portion of the system bandwidth or some other part of the system bandwidth (e.g., near an edge of the system bandwidth).

The techniques described herein may be used to transmit control data and/or traffic data with better reliability through more redundancy. The additional redundancy may be achieved via the M-PDCCH having a lower code rate and/or via more instances of the PDCCH and/or M-PDCCH. The additional redundancy may also be achieved via a Machine PDSCH (M-PDSCH) having a lower code rate and/or via more instances of the PDSCH and/or M-PDSCH In one design, control data may first be transmitted to a wireless device, and traffic data may then be transmitted to the wireless device based on the control data. The wireless device may receive and decode the control data. The wireless device may thereafter receive and decode the traffic data, as it is received, based on the decoded control data. In another design, control data and traffic data may be transmitted concurrently to a wireless device, e.g., on the M-PDCCH, PDSCH, or M-PDSCH. The wireless device may receive the control data and traffic data, buffer the traffic data, decode the control data, and then decode the buffered traffic data based on the decoded control data.

For clarity, much of the description above covers transmitting data (e.g., control data and/or traffic data) on the downlink to wireless devices (e.g., remote devices). The techniques described herein may also be used to transmit data on the uplink from wireless devices.

A wireless device may normally transmit (i) only control data on the PUCCH or (ii) only traffic data or both control data and traffic data on the PUSCH to a base station. The PUCCH and PUSCH may each support operation down to a particular minimum SNR. A robust physical channel may be defined for the uplink and may be referred to as a Machine PUCCH (M-PUCCH), a Machine PUSCH (M-PUSCH), etc. The M-PUSCH may support operation at a lower SNR through use of a lower code rate to generate more redundancy information for data.

In one design, different robust physical channels may be used to transmit control data and traffic data on a given link and may have different characteristics. For example, the M-PDCCH and M-PUCCH may be used to transmit control data on the downlink and uplink, respectively, and may have a smaller bandwidth. The M-PDSCH and M-PUSCH may be used to transmit traffic data on the downlink and uplink, respectively, and may have a wider bandwidth. The wider bandwidth may allow for use of more transmit power to transmit more data when there is a transmit power spectral density (PSD) limitation. The M-PDCCH and M-PUCCH may also support few code rates (e.g., one code rate) whereas the M-PDSCH and M-PUSCH may support more code rates.

In another design, a single robust physical channel may be used to transmit control data and traffic data on a given link. For example, the M-PDCCH may be used to transmit control data and traffic data on the downlink, and the M-PUCCH may be used to transmit control data and traffic data on the uplink. The robust physical channel for each link may have configurable parameters and may support different bandwidths and/or different code rates.

In yet another aspect, data (e.g., control data and/or traffic data) for remote devices may be scheduled when network loading is light in order to improve network performance. Communication under low SNR conditions may impact the performance of the entire wireless network. To reduce this impact, remote devices may be scheduled during times when network loading is light, e.g., at night and/or on weekends. This flexible scheduling may be possible due to relaxed delay requirements of remote devices, which may be able to tolerate long delays without affecting their performance.

In one design, communication for remote devices may be scheduled on the network side, and base stations may advertise their schedules via system messages. In this design, a remote device may receive a schedule from its serving base station and may operate based on the schedule. For example, the schedule may indicate when communication is allowed for the remote device. The remote device may sleep during the time in which communication is not allowed and may wake up during the time in which communication is allowed.

In another design, communication for remote devices may be specified (e.g., in a standard) and may be known a priori by remote devices and base stations. In this design, a remote device may operate in accordance with a schedule that is known.

In yet another design, remote devices can estimate when network loading might be light, e.g., based on time-of-day and day-of-week timing maintained by the remote devices. The remote devices may initiate communication during the times when network loading is deemed to be light. The remote devices may also estimate their channel conditions and may wait until they have better channel conditions before initiating communication.

In yet another design, a remote device may receive a persistent grant that is valid for an extended period of time, e.g., indefinitely until the persistent grant is canceled. The persistent grant may allow transmission by the remote device during time when network loading is light. The remote device may transmit data based on the persistent grant. Alternatively, the remote device may send a scheduling request when it has data to transmit on the uplink. The remote device may then listen for an uplink grant from the serving base station and may transmit data based on the uplink grant.

Figure 6:
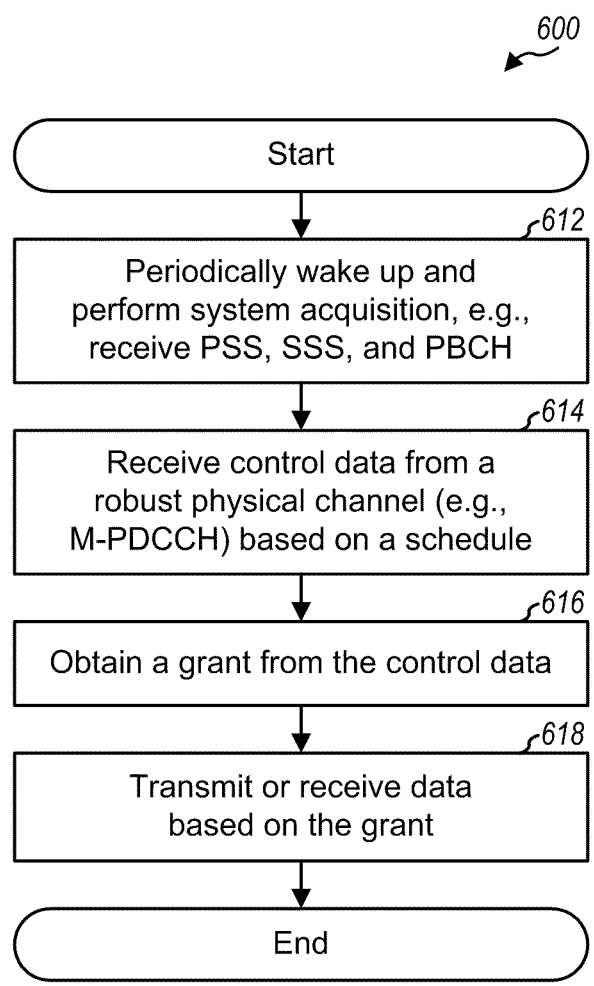
FIG. 6 shows operation by a wireless device.

FIG. 6 shows a design of operation by a remote device. The remote device may periodically wake up to perform system acquisition (block 612). The remote device may wake up periodically based on a schedule received from a serving base station or known a priori by the remote device. For system acquisition, the remote device may receive the PSS, SSS, and PBCH. The PSS and SSS may be static signals. Hence, the remote device may receive the PSS and SSS over multiple radio frames and may accumulate the energy of the PSS and SSS to enable detection at low SNR. The PBCH may be semi-static. Hence, the remote device may receive the PBCH over multiple radio frames and may accumulate the energy of the PBCH to enable detection at low SNR. The remote device may receive control data from a robust physical channel (e.g., the M-PDCCH) based on the schedule (block 614). The remote device may obtain a grant from the control data (block 616) and may transmit or receive data (e.g., control data and/or traffic data) based on the grant (block 618).

The remote device may only transmit traffic data on the uplink and may not receive traffic data on the downlink. In this case, the remote device may wake up whenever there is traffic data to transmit.

The techniques described herein may enable operation in lower SNR and possibly with lower power consumption. The techniques may allow a wireless network to support remote devices and M2M applications. The wireless network can provide wireless wide area network (WWAN) communication coverage for the remote devices based on the techniques described herein.

FIG. 7 shows a design of a process 700 for communicating in a wireless network. At least one physical channel selected for a wireless device from among a first physical channel having a first minimum SNR and a second physical channel having a second minimum SNR, which is lower than the first minimum SNR, may be determined (block 712). Data may be exchanged (e.g., transmitted or received) between the wireless device and a base station on the at least one physical channel (block 714).

In one design, process 700 may be performed by the base station. For block 714, the base station may transmit data to, or receive data from, the wireless device on the at least one physical channel. In another design, process 700 may be performed by the wireless device, which may be (i) a remote device operating without direct human control or (i) a UE operating with direct human control. For block 714, the wireless device may receive data from, or transmit data to, the base station on the at least one physical channel.

In one design, either the first physical channel or the second physical channel may be selected for the wireless device based on an SNR requirement, or a category, or some other characteristics of the wireless device. In another design, the first and second physical channels may both be selected for the wireless device based on the SNR requirement, or category, or some other characteristics of the wireless device. The category of the wireless device may be defined based on quality-of-service (QoS) requirements of the wireless device, e.g., delay requirements, traffic class, etc. In general, any number of options may be available, and each option may include one or more of the available physical channels. One of the options may be selected for the wireless device.

In one design, the first and second physical channels may be for the downlink and may comprise the PDCCH and M-PDCCH described above. In another design, the first and second physical channels may be for the uplink and may comprise the PUCCH and M-PUCCH described above.

The first and second physical channels may have different characteristics besides their minimum SNRs. In one design, the first physical channel may be transmitted in a first region (e.g., a control region) of a subframe, and the second physical channel may be transmitted in a second region (e.g., a data region) of the subframe. The first and second regions may be time division multiplexed (e.g., as shown in FIG. 3A) or frequency division multiplexed (e.g., as shown in FIG. 3B). In one design, the second physical channel may have a lower code rate and more redundancy than the first physical channel. In one design, the first physical channel may be transmitted in any part of the system bandwidth whereas the second physical channel may be restricted to a designated portion of the system bandwidth. In one design, data may be transmitted in a single instance of the first physical channel and may be transmitted in one or more instances of the second physical channel. For example, data may be transmitted in a plurality of instances of the at least one physical channel to improve reliability of the data.

In one design, only control data may be exchanged on the at least one physical channel. In this design, traffic data may be exchanged between the wireless device and the base station on a third physical channel based on a grant included in the control data. The third physical channel may have wider bandwidth than the second physical channel. In another design, both control data and traffic data may be exchanged on the at least one physical channel, e.g., either sequentially or concurrently.

FIG. 8 shows a design of an apparatus 800 for communicating in a wireless network. Apparatus 800 includes a module 812 to determine at least one physical channel selected for a wireless device from among a first physical channel having a first minimum SNR and a second physical channel having a second minimum SNR, which is lower than the first minimum SNR, and a module 814 to exchange data between the wireless device and a base station on the at least one physical channel.

FIG. 9 shows a design of a process 900 for communicating in a wireless network. Network loading may be determined (block 912). Communication between a wireless device and a base station may occur when the network loading is light (block 914). The wireless device may operate without direct human control and may have delay tolerant data.

In one design, the base station may determine when the network loading is light, e.g., based on actual monitoring of network loading. The base station may generate a schedule based on the network loading, and the schedule may indicate when communication is allowed for the wireless device. The base station may transmit the schedule to the wireless device, e.g., broadcast the schedule to all wireless devices. In another design, the time during which the network loading is light may be given by a predefined schedule, which may cover certain night time and/or weekend hours. In this design, the base station and wireless device may know a priori when the wireless network is light, and no schedule may be sent over the air.

In one design, process 900 may be performed by the base station. For block 914, the base station may transmit data (e.g., control data and/or traffic data) on the downlink to the wireless device and/or may receive data on the uplink from the wireless device. In another design, process 900 may be performed by the wireless device. For block 914, the wireless device may receive data on the downlink from the base station and/or may transmit data on the uplink to the base station. The wireless device may also receive a persistent grant from the base station and may transmit data, when it is available, based on the persistent grant.

FIG. 10 shows a design of an apparatus 1000 for communicating in a wireless network. Apparatus 1000 includes a module 1012 to determine network loading, and a module 1014 to communicate between a wireless device and a base station when the network loading is light, the wireless device operating without direct human control and having delay tolerant data.

The modules in FIGS. 8 and 10 may comprise processors, electronic devices, hardware devices, electronic components, logical circuits, memories, software codes, firmware codes, etc., or any combination thereof.

Figure 11:
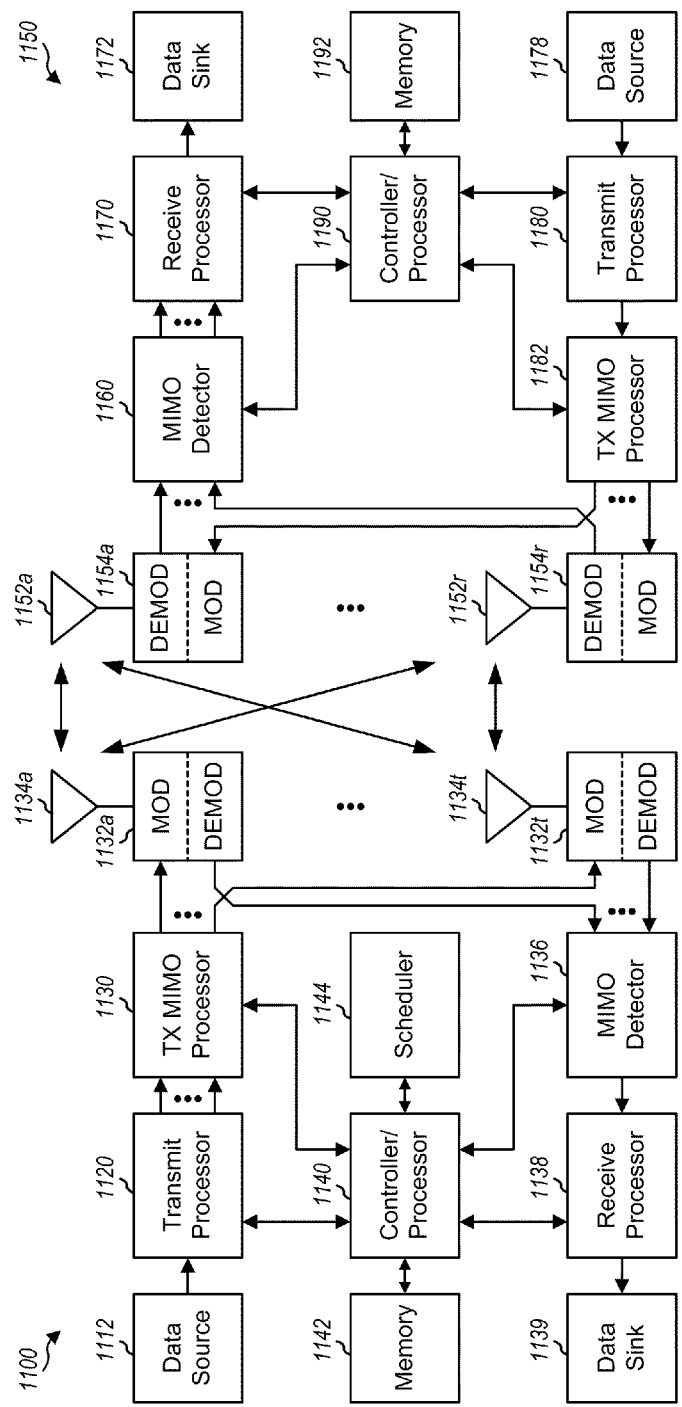
FIG. 11 shows a block diagram of a base station and a wireless device.

FIG. 11 shows a block diagram of a design of a base station 1100 and a wireless device 1150, which may be one of the base stations and one of the wireless devices in FIG. 1. Base station 1100 may be equipped with T antennas 1134a through 1134t, and wireless device 1150 may be equipped with R antennas 1152a through 1152r, where in general T≥1 and R≥1.

At base station 1100, a transmit processor 1120 may receive traffic data from a data source 1112 for one or more wireless devices, process (e.g., encode and modulate) the traffic data for each wireless device based on one or more modulation and coding schemes selected for that wireless device, and provide data symbols for all wireless devices. Transmit processor 1120 may also process control data (e.g., for the PCFICH, PHICH, PDCCH, M-PDCCH, etc.) and provide control symbols. Transmit processor 1120 may also generate reference symbols for the PSS, SSS, and reference signals. A transmit (TX) multiple-input multiple-output (MIMO) processor 1130 may precode the data symbols, the control symbols, and/or the reference symbols (if applicable) and may provide T output symbol streams to T modulators (MOD) 1132a through 1132t. Each modulator 1132 may process its output symbol stream (e.g., for OFDM, etc.) to obtain an output sample stream. Each modulator 1132 may further condition (e.g., convert to analog, filter, amplify, and upconvert) its output sample stream and generate a downlink signal. T downlink signals from modulators 1132a through 1132t may be transmitted via T antennas 1134a through 1134t, respectively.

At wireless device 1150, R antennas 1152a through 1152r may receive the T downlink signals from base station 1100, and each antenna 1152 may provide a received signal to an associated demodulator (DEMOD) 1154. Each demodulator 1154 may condition (e.g., filter, amplify, downconvert, and digitize) its received signal to obtain samples and may further process the samples (e.g., for OFDM, etc.) to obtain received symbols. A MIMO detector 1160 may perform MIMO detection on the received symbols (if applicable) and provide detected symbols. A receive processor 1170 may process (e.g., demodulate and decode) the detected symbols to obtain decoded traffic data and control data for wireless device 1150. Processor 1170 may provide the decoded traffic data to a data sink 1172 and provide the decoded control data to a controller/processor 1190.

On the uplink, traffic data from a data source 1178 and control data from controller/processor 1190 may be processed (e.g., encoded and modulated) by a transmit processor 1180, spatially processed by a TX MIMO processor 1182 (if applicable), and further processed by modulators 1154a through 1154r to generate R uplink signals, which may be transmitted via antennas 1152a through 1152r. At base station 1100, the R uplink signals from wireless device 1150 may be received by antennas 1134a through 1134t, processed by demodulators 1132a through 1132t, detected by a MIMO detector 1136 (if applicable), and further processed (e.g., demodulated and decoded) by a receive processor 1138 to recover the traffic data and control data transmitted by wireless device 1150. Controller/processor 1140 may control data transmission to/from wireless device 1150 based on the control data received from wireless device 1150. Processor 1140 may provide the recovered traffic data to a data sink 1139.

Controllers/processors 1140 and 1190 may direct the operation at base station 1100 and wireless device 1150, respectively. Processor 1140 and/or other processors and modules at base station 1100 may perform or direct process 700 in FIG. 7, process 900 in FIG. 9, and/or other processes for the techniques described herein. Processor 1190 and/or other processors and modules at wireless device 1150 may perform or direct process 600 in FIG. 6, process 700 in FIG. 7, process 900 in FIG. 9, and/or other processes for the techniques described herein. Memories 1142 and 1192 may store data and program codes for base station 1100 and wireless device 1150, respectively. A scheduler 1144 may schedule wireless device 1150 and/or other wireless devices for data transmission on the downlink and/or uplink based on the control data received from all wireless devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
determining at least one physical channel selected for a wireless device from among a first physical channel having a first minimum signal-to-noise ratio for reliable reception of the first physical channel and a second physical channel having a second minimum signal-to-noise ratio for reliable reception of the second physical channel, wherein:
the second minimum signal-to-noise ratio is lower than the first minimum signal-to-noise ratio, the minimum signal-to-noise ratio of each of the first and second physical channels is determined based at least on a coding scheme and an amount of redundancy for said each physical channel, the first and second physical channels are encoded separately and transmitted on different time frequency resources, the first and second physical channels are available for use for direct communication between the wireless device and a base station, and the first physical channel is transmitted in a control region of a subframe and the second physical channel is transmitted in a data region of the subframe; and exchanging data between the wireless device and the base station on the at least one physical channel, wherein exchanging the data comprises transmitting a different part of control data in each of a plurality of instances of the at least one physical channel.

2. The method of claim 1, wherein either the first physical channel or the second physical channel is selected for the wireless device based on a signal-to-noise ratio requirement or a category of the wireless device.

3. The method of claim 1, wherein the first and second physical channels are both selected for the wireless device based on a signal-to-noise ratio requirement or a category of the wireless device.

4. The method of claim 1, wherein the second physical channel has a lower code rate and more redundancy than the first physical channel.

5. The method of claim 1, wherein the first physical channel is transmitted in any part of system bandwidth, and wherein the second physical channel is restricted to a designated portion of the system bandwidth.

6. The method of claim 1, wherein the data exchanged on the at least one physical channel comprises control data for the wireless device, or traffic data for the wireless device, or both control data and traffic data.

7. The method of claim 6, further comprising:
exchanging traffic data between the wireless device and the base station on a third physical channel based on a grant included in the control data.

8. The method of claim 7, wherein the third physical channel has wider bandwidth than the second physical channel.

9. The method of claim 1, wherein the determining at least one physical channel and the exchanging data are performed by the base station.

10. The method of claim 1, wherein the determining at least one physical channel and the exchanging data are performed by the wireless device.

11. The method of claim 1, wherein the wireless device operates without direct human control.

12. An apparatus for wireless communication, comprising:
means for determining at least one physical channel selected for a wireless device from among a first physical channel having a first minimum signal-to-noise ratio for reliable reception of the first physical channel and a second physical channel having a second minimum signal-to-noise ratio for reliable reception of the second physical channel, wherein:
the second minimum signal-to-noise ratio is lower than the first minimum signal-to-noise ratio,
the minimum signal-to-noise ratio of each of the first and second physical channels is determined based at least on a coding scheme and an amount of redundancy for said each physical channel,
the first and second physical channels are encoded separately and transmitted on different time frequency resources,
the first and second physical channels are available for use for direct communication between the wireless device and a base station, and
the first physical channel is transmitted in a control region of a subframe and the second physical channel is transmitted in a data region of the subframe; and
means for exchanging data between the wireless device and the base station on the at least one physical channel, wherein the means for exchanging the data comprise means for transmitting a different part of control data in each of a plurality of instances of the at least one physical channel.

13. The apparatus of claim 12, wherein either the first physical channel or the second physical channel is selected for the wireless device based on a signal-to-noise ratio requirement or a category of the wireless device.

14. The apparatus of claim 12, wherein the data exchanged on the at least one physical channel comprises control data for the wireless device, and wherein the apparatus further comprises:
means for exchanging traffic data between the wireless device and the base station on a third physical channel based on a grant included in the control data.

15. The apparatus of claim 12, wherein means for determining at least one physical channel comprises means for selecting the second physical channel having a lower minimum signal-to-noise ratio than the first physical channel.

16. The apparatus of claim 12, wherein the second physical channel is transmitted on more time-frequency resources than the first physical channel.

17. An apparatus for wireless communication, comprising:
at least one processor configured to:
determine at least one physical channel selected for a wireless device from among a first physical channel having a first minimum signal-to-noise ratio for reliable reception of the first physical channel and a second physical channel having a second minimum signal-to-noise ratio for reliable reception of the second physical channel, wherein:
the second minimum signal-to-noise ratio is lower than the first minimum signal-to-noise ratio,
the minimum signal-to-noise ratio of each of the first and second physical channels is determined based at least on a coding scheme and an amount of redundancy for said each physical channel,
the first and second physical channels are encoded separately and transmitted on different time frequency resources,
the first and second physical channels are available for use for direct communication between the wireless device and a base station, and
the first physical channel is transmitted in a control region of a subframe and the second physical channel is transmitted in a data region of the subframe, and
exchange data between the wireless device and the base station on the at least one physical channel, wherein exchanging the data comprises transmitting a different part of control data in each of a plurality of instances of the at least one physical channel.

18. The apparatus of claim 17, wherein either the first physical channel or the second physical channel is selected for the wireless device based on a signal-to-noise ratio requirement or a category of the wireless device.

19. The apparatus of claim 17, wherein the data exchanged on the at least one physical channel comprises control data for the wireless device, and wherein the at least one processor is configured to exchange traffic data between the wireless device and the base station on a third physical channel based on a grant included in the control data.

20. A computer program product, comprising:
a non-transitory computer-readable medium comprising:
code for causing at least one computer to determine at least one physical channel selected for a wireless device from among a first physical channel having a first minimum signal-to-noise ratio for reliable reception of the first physical channel and a second physical channel having a second minimum signal-to-noise ratio for reliable reception of the second physical channel, wherein:
the second minimum signal-to-noise ratio is lower than the first minimum signal-to-noise ratio,
the minimum signal-to-noise ratio of each of the first and second physical channels is determined based at least on a coding scheme and an amount of redundancy for said each physical channel,
the first and second physical channels are encoded separately and transmitted on different time frequency resources,
the first and second physical channels are available for use for direct communication between the wireless device and a base station, and
the first physical channel is transmitted in a control region of a subframe and the second physical channel is transmitted in a data region of the subframe; and
code for causing the at least one computer to exchange data between the wireless device and the base station on the at least one physical channel, wherein the code for causing the at least one computer to exchange the data comprises code for causing the at least one computer to transmit a different part of control data in each of a plurality of instances of the at least one physical channel.

* * * * *